Oct. 12, 1965   J. L. GROEBE ETAL   3,211,537
FLUID-SOLIDS CONTACTING
Filed April 11, 1960
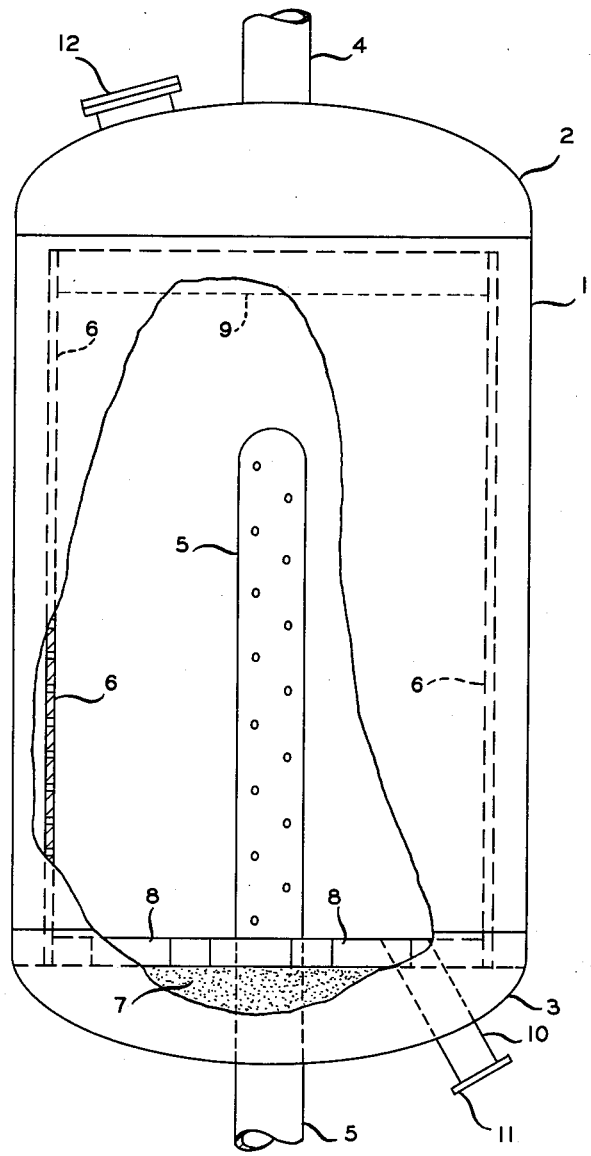
INVENTORS
J. L. GROEBE
J. H. RANDALL
BY
*Hudson & Young*
ATTORNEYS

United States Patent Office

3,211,537
FLUID-SOLIDS CONTACTING
John L. Groebe, Bartlesville, Okla., and John H. Randall, Phillips, Tex., assignors to Phillips Petroleum Company, a corporation of Delaware
Filed Apr. 11, 1960, Ser. No. 21,338
1 Claim. (Cl. 23—288)

This invention relates to an improved method and/or apparatus for fluid-solids contact. In one aspect, this invention relates to a method of contacting a fluid with a solid contact material wherein fluid is prevented from assuming an unduly long flow path through the contact material by confining the exterior surface of such contact material at areas which would allow such unduly long flow with an inert filling material. In another aspect, this invention relates to an apparatus for fluid-solids contact comprising a cylindrically formed, fluid-pervious contact mass having a fluid collection conduit disposed axially thereof and an inert filling material adjacent one end thereof.

It is known that one of the major problems in contacting fluids with a solid, such as in a catalytic conversion process, is controlling the time in which the fluid is in contact with the solid. In a catalytic conversion process, excess contact time may cause cracking of the reactant stream beyond the desired stage with the resultant harmful deposition of carbon on the catalyst mass. Many such contacting processes are carried out at relatively high pressures, and it is also well known that an economical and convenient shape for such a high pressure zone comprises a cylindrical vessel having hemispherical, ellipsoidal, or otherwise dished ends. In order to contact the fluid under treatment with the solid treating mass for the proper length of time, the fluid is often introduced into the contact zone, passed through the contact mass, and then withdrawn through a collector tube ararngement. It can be readily seen that the geometry of such a zone will determine the contact time. In a pressure vessel such as previously described, the problem of unequal flow paths in various portions of the contact zone is aggravated by the domed shape of the vessel bottom. Specifically, a contact mass is often supported within a pressure vessel by a basket which spaces the mass from the wall of the vessel. A perforated collection tube leads from the center of the mass down through it and out the bottom of the vessel. Fluid is introduced outside the basket, passes through the mass, and into the collection tube, and thence out of the vessel. If the catalyst mass is allowed to fill the domed bottom of the vessel, some of the reaction fluid will travel a longer path to the bottom of the vessel on its way to the collection tube. This often causes hot spots in the catalyst mass with subsequent spalling of the catalyst, cracking of the feed, and deposition of carbon on the catalyst.

It is an object of this invention to provide an improved method for fluid-solids contact. It is another object of this invention to provide improved means for supporting and discharging a catalyst contact mass. It is further object of this invention to provide an easily renewable catalyst support surface. It is still another object of this invention to provide an improved catalyst support wherein the flow paths of the reactant fluid through the contact mass are equalized.

Other aspects, objects, and the several advantages of the invention are apparent from a study of the disclosure, the drawing, and the appended claims.

These objects have been accomplished by our invention which comprises a method of contacting a fluid with a solid contact material wherein fluid is prevented from assuming an unduly long flow path through the contact material by confining the exterior surface of such contact material at areas which would allow such unduly long flow paths with an inert filling material. The invention further comprises an apparatus for fluids-solids contact comprising a cylindrically formed, fluid-pervious contact mass having a fluid collection conduit disposed axially thereof and an inert filling material adjacent one end thereof.

In the drawing, 1 refers to a cylindrical shell, closed at the upper end by domed head 2 and closed at the lower end by domed head 3. A fluid inlet conduit 4 enters head 2. Fluid collector conduit and outlet 5 traverses the shell axially and leaves the reaction shell through domed head 3. It is noted that this conduit is provided with perforations. Within the shell 1 and spaced a suitable distance from it, there is provided a cylindrical perforated shell 6, which serves to provide an annular space through which reaction fluid can flow. A layer of finely divided, inert material, in this instance, sand, is shown at 7 as substantially filling the lower domed head 3. On top of this, there is provided a layer of closely spaced, inert blocks 8, in this instance, bricks. It is not necessary, in fact it is undesirable, that the blocks be fastened to each other as by mortar. The normal level of the catalyst contact mass is shown by line 9. A clean-out nozzle is provided at 10. This nozzle extends through the bottom of the vessel and opens substantially flush with the upper surface of blocks 8; it is provided at its lower end with a closure 11 during normal operation. An access way 12 can be provided in an upper portion of the vessel in order to charge the contact mass and clean out the vessel.

The apparatus of the invention was used in a reforming operation as follows:

Four reactors of the type shown in the drawing were connected in series. These reactors were about 5 feet in diameter, and the first three were each about 9 feet in height. The last was about 18 feet in height. Each reactor was charged with a catalyst comprising primarily platinum, fluorine, and chlorine supported on Kieselguhr. About 5,500 pounds of catalyst were used in each. A feed of about half paraffins and half naphthenes with some aromatics and a trace of olefins, boiling at approximately 200° F. and having a gravity of about 62° API was fed through the reaction chambers. This feed, in the quantity of about 7,000 barrels per day, had previously been dried, boosted to the reaction pressure of 350 p.s.i.g., combined with compressed hydrogen recycle gas, vaporized and heated to a reaction temperature in the range of 890 to 940° F. The reformed product contained about equal parts of paraffins and aromatics with a small amount of naphthenes. After several months use, the catalyst cases were emptied. It was noted that the bricks were in place and it was easy to clean the catalyst from the chamber. This was done by draining a major proportion of the catalyst through the clean-out nozzle, and the sweeping the residue of the catalyst from the brick surface into the nozzle.

Although a perforated collection tube has been described, a slotted, sintered, or otherwise apertured tube will, in some instances, be satisfactory. The finely divided, inert material described in the preceding example was sand; however, it is understood that other materials inert at the conditions encountered may be used, such as diatomaceous earth or ground brick. In place of bricks, other blocks inert under the conditions encountered and capable of being fitted closely together, such as plastic or glass blocks, can be used. The invention has been described in conjunction with a reforming operation; it is understood, however, that the invention is adaptable to many fluid-solids contacting processes.

Reasonable variation and modification are possible within the scope of the foregoing disclosure, the drawing, and the appended claim to the invention, the essence of which is that there is provided a method and/or an apparatus for fluid-solids contact wherein fluid is prevented from assuming an unduly long flow path through a contact material by confining the surface of such contact material at areas which would allow such unduly long flow paths with an inert filling material.

We claim:

Apparatus for contacting a fluid stream with a finely-divided contact mass comprising:

(a) an outer vertical, cylindrical shell;
(b) upper and lower convex closures on ends of said shell;
(c) contact mass containing means comprising a perforate surface annularly spaced within said shell and substantially coextensive with said shell;
(d) fluid inlet means communicating with said upper closure;
(e) fluid outlet means extending through said lower closure into said contact mass containing means for a substantial length of said contact mass containing means, fluid outlet means said being foramious only within the confines of said contact mass retaining means;
(f) an inert filling material extending across and substantially filling said lower closure,
(g) a layer of inert, ceramic blocks covering said filling material and being supported thereby; and
(h) contact material emptying means comprising conduit means penetrating said lower closure and passing through said filling material and said blocks.

References Cited by the Examiner

UNITED STATES PATENTS

| | | | |
|---|---|---|---|
| 2,363,738 | 11/44 | Mather et al. | 208—149 |
| 2,779,714 | 1/57 | Keith | 208—146 |
| 2,853,370 | 9/58 | Downing | 23—288.3 |
| 2,886,517 | 5/59 | Patton et al. | 208—146 |
| 2,893,852 | 7/59 | Montgomery | 208—146 |
| 2,905,633 | 9/59 | Rosinski | 208—146 |
| 2,969,318 | 1/61 | Woodall | 208—138 |
| 2,980,515 | 4/61 | Horner et al. | 23—288 |
| 2,997,374 | 8/61 | Lavender et al. | 23—288 |

ALPHONSO D. SULLIVAN, *Primary Examiner.*